US008924470B2

(12) United States Patent
Krahulec et al.

(10) Patent No.: US 8,924,470 B2
(45) Date of Patent: *Dec. 30, 2014

(54) METHODS AND SYSTEMS FOR PROVIDING WEB APPLICATIONS

(75) Inventors: John Kuhio Krahulec, Leesburg, VA (US); Michael Shields, Ashburn, VA (US)

(73) Assignee: Concept Solutions, LLC, Reston, VA (US)

(*) Notice: Subject to any disclaimer, the term of this patent is extended or adjusted under 35 U.S.C. 154(b) by 69 days.

This patent is subject to a terminal disclaimer.

(21) Appl. No.: 13/308,098

(22) Filed: Nov. 30, 2011

(65) Prior Publication Data

US 2012/0079565 A1 Mar. 29, 2012

Related U.S. Application Data

(63) Continuation of application No. 11/819,408, filed on Jun. 27, 2007, now Pat. No. 8,082,294.

(51) Int. Cl.
*G06F 15/16* (2006.01)
*G06F 17/30* (2006.01)

(52) U.S. Cl.
CPC ..... *G06F 17/30893* (2013.01); *Y10S 707/9994* (2013.01)
USPC ........... 709/203; 709/219; 709/225; 709/229; 717/120; 719/329; 707/999.01

(58) Field of Classification Search
CPC .............................. G06F 17/30893; G06F 8/70
USPC .......................... 709/203, 217, 219, 225, 229; 707/999.01; 719/329; 717/120

See application file for complete search history.

(56) References Cited

U.S. PATENT DOCUMENTS

| | | | |
|---|---|---|---|
| 5,872,915 A | 2/1999 | Dykes et al. | |
| 6,460,041 B2 | 10/2002 | Lloyd | |
| 6,701,321 B1 | 3/2004 | Tsai | |
| 6,823,382 B2 | 11/2004 | Stone | |
| 6,832,226 B1 | 12/2004 | Parker | |
| 7,003,528 B2 | 2/2006 | Dan et al. | |
| 7,043,716 B2 | 5/2006 | Zimmer et al. | |
| 7,062,511 B1 * | 6/2006 | Poulsen | 707/999.01 |
| 7,111,006 B2 | 9/2006 | Vange et al. | |
| 7,117,208 B2 | 10/2006 | Tamayo et al. | |
| 7,127,518 B2 | 10/2006 | Vange et al. | |
| 8,082,294 B2 * | 12/2011 | Krahulec et al. | 709/203 |
| 2003/0115349 A1 | 6/2003 | Brinkman et al. | |
| 2003/0188291 A1 | 10/2003 | Fisher | |
| 2004/0015476 A1 | 1/2004 | Twaddle | |
| 2004/0111424 A1 | 6/2004 | Roman et al. | |

(Continued)

*Primary Examiner* — Oanh Duong
(74) *Attorney, Agent, or Firm* — Finnegan, Henderson, Farabow, Garrett & Dunner, LLP

(57) ABSTRACT

Methods and systems consistent with certain disclosed embodiments provide applications. In one embodiment, a system is disclosed that provides applications. The system may include a computer system that receives a request related to an application and a database system. The database system may include a database and an application server module and a framework of software modules logically arranged to provide controlled access to data in the database. The application server module may use the data to generate content to generate a Web page related to the application. Further, the software modules may be logically arranged in layers such that access to data or software in a software module of one layer is performed by executing software in another software module of another layer.

13 Claims, 6 Drawing Sheets

(56) References Cited

U.S. PATENT DOCUMENTS

| | | |
|---|---|---|
| 2004/0125132 A1* | 7/2004 | Katagiri et al. ............... 345/739 |
| 2005/0223392 A1 | 10/2005 | Cox et al. |
| 2005/0288983 A1 | 12/2005 | Biegler et al. |
| 2006/0094351 A1 | 5/2006 | Nowak et al. |
| 2007/0055756 A1 | 3/2007 | Richards et al. |
| 2007/0169049 A1 | 7/2007 | Gingell et al. |
| 2008/0005020 A1 | 1/2008 | Auvenshine et al. |
| 2008/0162564 A1 | 7/2008 | Massmann et al. |
| 2008/0178075 A1 | 7/2008 | Trethaway et al. |
| 2008/0235790 A1* | 9/2008 | Malhotra et al. ............... 726/20 |
| 2008/0256628 A1 | 10/2008 | Himmel et al. |
| 2009/0025057 A1* | 1/2009 | Mattsson ............... 726/1 |
| 2011/0307816 A9* | 12/2011 | Barnett et al. ............... 715/767 |

* cited by examiner

METHODS AND SYSTEMS FOR PROVIDING WEB APPLICATIONS

This is a continuation of application Ser. No. 11/819,408, filed Jun. 27,2007 now U.S. Pat. No. 8,082,294, allowed, which is incorporated herein by reference.

BACKGROUND OF THE INVENTION

I. Field of the Invention

The present invention generally relates to distributed systems that implement application services and, more particularly, relates to systems, methods, and articles of manufacture for dynamically providing application services in a distributed system.

II. Background and Material Information

The continued growth of networked systems, such as the Internet, and their use for communicating and performing multiple tasks, has spawned many software and hardware architectures and solutions that help enterprises conduct business in a global market. Many forms of distributed systems have been designed to address performance, scalability, and reliability issues inherent in remotely connected environments. One type of distributed system that emerged to overcome limitations of earlier systems is the three-tier architecture. The three tier architecture is a popular system arrangement that implements a middle tier server between client and server tiers. The middle tier provides process management services where enterprise business logic and rules, and process monitoring and development may be executed to handle requests from many distributed users operating at the client tier. The server tier is designed to handle database management tasks, such as file and data services for assisting the middle tier in delivering requesting information to the client tier. In some conventional systems, the middle tier may be separated into further layers for handling client requests received across distributed networks, such as the Internet. In such configurations, some three-tier architectures become a multi-layer architecture, where a Web server may be positioned as an intermediate layer between the client tier and the process management components of the middle tier. The Web server may be configured to receive requests from the Internet clients and generate Web pages with, for example, HyperText Mark-Up Language (HTML), using application services provided by the process management business logic.

While conventional distributed systems, such as the three tier architecture provides global enterprises with efficient and flexible solutions for providing shared resources to multiple clients, there are some drawbacks to their design and implementation. For example, in some environments the three tier architecture promotes disjointed design and development that results in inefficiencies when developing and implementing new applications for use in the system. Different developers work on different aspects of the architecture; database experts work on the database system, Web service developers work on application services in the middle tier, etc. Personnel associated with one tier may not be knowledgeable in the development and operations of another tier, which may result in a disconnect between the tiers. Further, by allowing a Web server to perform Web page and application creation, systems may lose control over certain information and how content is created, and possibly expose proprietary information to unauthorized access. Moreover, the number of communications between the server tier and the database tier to process client requests, and the type of code and infrastructure implemented by an enterprise may detrimentally affect the bandwidth and other network performances.

Article I. Accordingly, there is a need for a distributed system that provides the benefits of a three tier architecture while minimizing the potential problems of such an architecture in order to provide efficient, reliable, and secure applications for development and distribution.

SUMMARY OF THE INVENTION

The disclosed embodiments provide, among other things, improved methods, systems, and articles of manufacture for providing application services in a distributed environment.

In one embodiment consistent with certain aspects the present invention, a system is disclosed that provides applications. The system may include a computer system that receives a request related to an application and a database system. The database system may include a database and an application server module and a framework of software modules logically arranged to provide controlled access to data in the database. The application server module may use the data to generate content to generate a Web page related to the application. Further, the software modules may be logically arranged in layers such that access to data or software in a software module of one layer is performed by executing software in another software module of another layer.

In another embodiment, a system is disclosed for providing Web applications. The system may include a client configured to provide a request related to a Web application, a server configured to operate as an interface to receive the request related to the Web application and forward the request, and a database system configured to receive the request for the Web application from the server. The database system may include a database system module and an application server module. The database system module may be configured to perform database processes for processing database commands for accessing and manipulating data stored in a database. The application server module may be configured to perform application server processes that authenticate the request from the client related to the Web application. Further, application server module may issue one or more requests to the database system module for specific data for building a Web page associated with the requested Web application, build the Web page based on the specific data, and send the built Web page to the server for delivery to the server.

In another embodiment, a system is disclosed for providing Web applications that may include a developer configured to provide a request related to a Web application and a database system configured to receive the request for the Web application from the developer. The database system may include a database system module configured to perform database processes for processing database commands for accessing and manipulating data stored in a database. The database system may also include an application server module configured to perform application server processes that authenticate the request from the developer related to the Web application. The application server module may also issue one or more requests to the database system module for specific data used by the developer to create information for a Web page associated with the requested Web application, and to build the Web page based on the created information.

In another embodiment, a method is disclosed for providing Web applications. The method may include receiving a request related to a Web application and forwarding the request to a database system configured with a database system module. The database system module may include a database system module configured to perform database processes for processing database commands for accessing data stored in a database, and an application server module including a framework of software modules logically configured in layers. The method may further include requesting, by a first layer of the framework, authentication of the request and determining, by a second layer of the framework, whether the request is valid based on the request from the first layer. Additionally, the method may include retrieving, by the second layer, specific data from a third layer of the framework that is used to generate information related to the requested Web application. Further, the method may include generating, by the second layer, a document related to the Web application based on the generated information, providing, by the second layer, the generated document to the first layer, and providing, by the first layer, the generated document.

In another embodiment, a system is disclosed for providing Web applications including a database system that receives a request from a user related to a Web application and is configured with a database system module including a database system module configured to perform database processes for processing database commands for accessing data stored in a database. The database system may also include an application server module including a framework of software modules logically configured in layers. In one embodiment, the framework may include a first layer that authenticates the request by executing software on a second layer of the framework. The second layer may be configured to retrieve specific data from a third layer of the framework that is used to generate information related to the Web application. Moreover, the second layer may be configured to generate a document related to the Web application based on the generated information, and provide the generated document to the first layer. Further, the first layer may be configured to provide the generated document to the user.

In another embodiment, a method is disclosed for providing Web applications. The method may include receiving a request to provide an application and creating an application software package in an application server component. The application server component may be associated with (i) an application layer of a framework that is configured to provide software components that, when executed by a processor, perform processes for accessing predetermined Web applications and building a first type of Web applications, and (ii) a core layer of the framework that is configured to provide software components that, when executed by a processor, perform processes for providing a second type of Web application software that is secured from modification and accessible by authorized application layer software components to assist in building the first type of Web applications. The method may also include creating a reference to the application rendering package in a security component associated with the application layer of the framework. Further, the method may include creating a database software package that is configured to, when executed by a processor, perform one or more database management commands for accessing a database, and at least one database table, wherein the database software package is created in a database component associated with the application layer and core layer of the framework. Also, the method may include creating a reference to the database software package in the application server component and assigning one or more privileges to the application. Additionally, the method may include assigning one or more Web pages that are related to the application, and assigning one or more privileges to one or more data fields associated with the application that control access to the one or more data fields.

In another embodiment, a framework associated with a database system is disclosed for providing Web applications. The framework may include an application layer configured to provide software components that, when executed by a processor, perform processes for accessing predetermined Web applications and building a first type of Web applications. The application layer may include a security software component that provides front-end security processes for authenticating requests related to Web applications maintained by the framework. Further, the application layer may include an application server component that provides application server functions for building Web applications in response to the requests authenticated by the security software component. The application layer may also include a database software component that provides back-end database access and manipulation processes for providing data stored in a database and used by the application server software component in building the Web applications. The framework may also include a core layer configured to provide software components that, when executed by a processor, perform processes for providing a second type of Web application software that is secured from modification and accessible by authorized application layer software components to assist in building the first type of Web applications. In one embodiment, the core layer may include a core application server component including secure software packages for generating data fields in the Web application being built by the application server component. The core layer may also include a core data component including secure software packages for accessing secure data stored in the database. In one embodiment, the security component may also be included in a security layer, the application server component and core application server component may be included in a Web application layer. The database component and core data component may also be included in a database table layer of the framework.

It is to be understood that both the foregoing general description and the following detailed description are exemplary and explanatory only and are not restrictive of the invention, as described. Further features and/or variations may be provided in addition to those set forth herein. For example, the disclosed embodiments may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention. In the drawings.

DETAILED DESCRIPTION

Methods, systems, and articles of manufacture consistent with certain aspects of the present invention provide a multi-tier distributed system that allows a database system to provide both database and application server functionalities that, for example, determine locally the type of information (e.g., data, content, etc.) used for creating a Web application based on user privileges processed at the database system. Further, certain disclosed embodiments provide a unique framework that includes multiple layers of software components that individually and/or collectively perform processes for building, developing and providing Web applications.

Reference will now be made in detail to exemplary embodiments of the invention, examples of which are illustrated in the accompanying drawings. Wherever possible, the same reference numbers will be used throughout the drawings to refer to the same or like parts.

Figure 1:
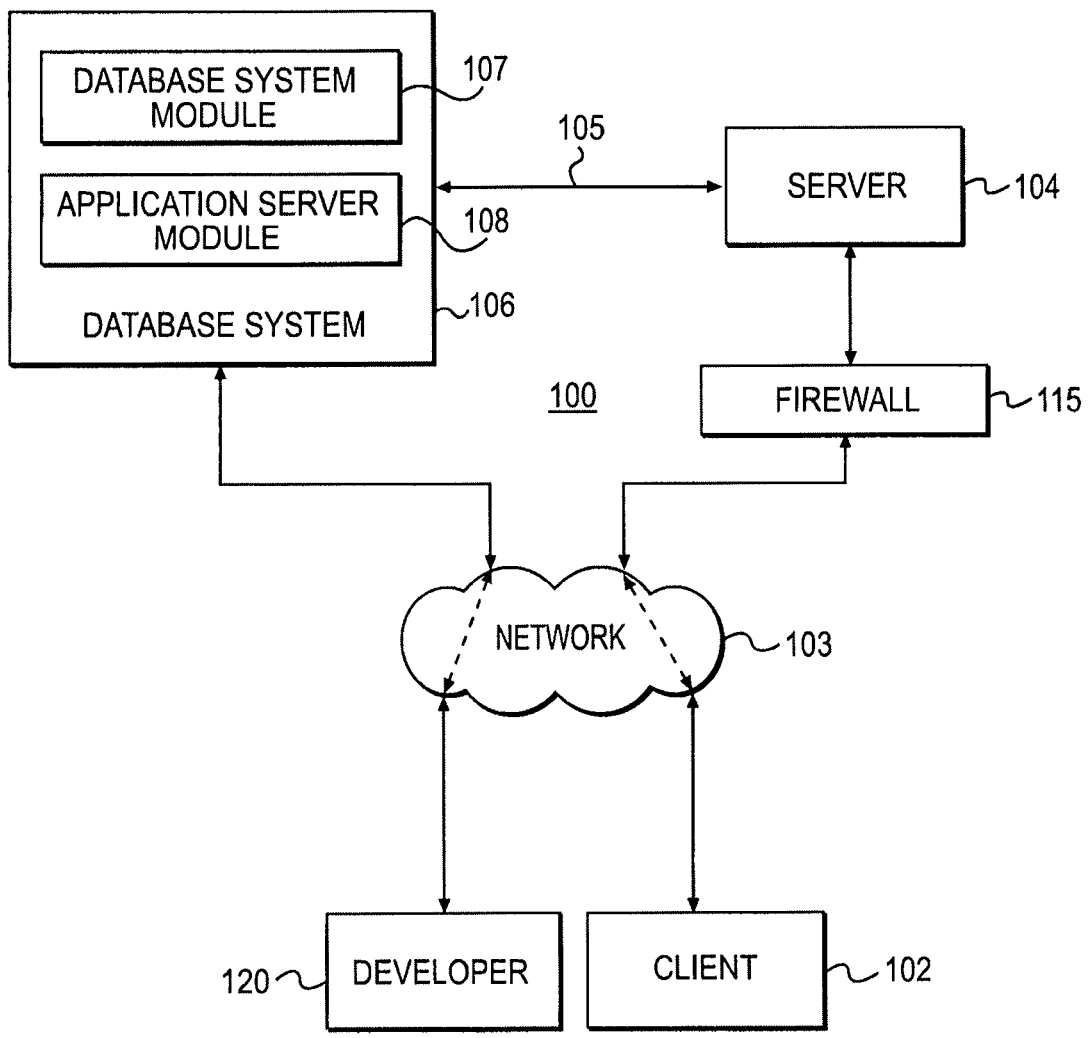
FIG. 1 illustrates an exemplary system environment for implementing certain embodiments of the present invention.

FIG. 1 illustrates an exemplary system environment 100, in which certain embodiments and features of the invention may be implemented. In one embodiment, environment 100 is a distributed system that provides resource and information sharing between one or more clients and a server system. In this example, system environment 100 includes one or more clients 102, one or more servers 104, and one or more database systems 106 interconnected by network 103. In another embodiment, system environment may include one or more developers 120.

Client 102 may be one or more computer systems configured to send requests for information (e.g., content, application, data, program code, etc.) and receive responses to the requests via network 103. For example, client 102 may be a desktop PC, a laptop PC, a PDA, a cell phone devices, or any other processor, computer, or device (or group thereof) capable of requesting and receiving information over a network, such as the Internet. In one embodiment, client 102 may include one or more computer or data processing devices that have hardware (e.g., one or more processors, storage memory, data buses, network interface, etc.), software (e.g., web browsers, application programs, operating systems, other executable program code written in any known programming language such as PL/SQL, AJAX, XML, JavaScript™, C, C++, Java™, etc.), and/or firmware (e.g., software embedded in a hardware device). Client 102 may be configured to access one or more Web pages at one or more Web sites maintained on one or more server computer systems over network 103. A user may operate client 102 to perform functions consistent with certain embodiments of the disclosed invention. Further, in certain embodiments, client 102 may access one or more servers (e.g., server 104) via network 103, and in some instances, do so through a secured layer, such as firewall 115, as shown in FIG. 1 via the dotted line extending from client 102 in network 103 to firewall 115.

Developer 120 may be one or more computer systems configured to send requests for information (e.g., content, application, data, program code, etc.) and receive responses to the requests via network 103. For example, client 102 may be a desktop PC, a laptop PC, a PDA, a cell phone devices, or any other processor, computer, or device (or group thereof) capable of requesting and receiving information over a network, such as the Internet. In one embodiment, client 102 may include one or more computer or data processing devices that have hardware (e.g., one or more processors, storage memory, data buses, network interface, etc.), software (e.g., web browsers, application programs, operating systems, other executable program code written in any known programming language such as PL/SQL, AJAX, XML, JavaScript™, C, C++, Java™, etc.), and/or firmware (e.g., software embedded in a hardware device). Developer 120 may be configured to access one or more applications maintained on one or more computer systems over network 103. In one embodiment, a user, such as an application developer, may use developer 120 to access database system 106 directly through network 103, as shown by the dotted line extending from developer 120 in network 103 to database system 106. Developer 120 may access database system 106 to perform one or more processes consistent with certain disclosed embodiments.

Network 103 may be any type of communication network configured to transmit information between distributed components of system environment 100. Network 103 may be a wireless and/or wireline network including one or more components (e.g., hardware, software, and/or firmware) configured to receive, route, translate, and deliver information. For example, network 103 may be the Internet, an extranet, and Intranet, a Local Area Network, etc. and include infrastructure that implements the communication of information over these types of networks, such as wireless/wireline base stations, transceivers, and related technology.

Server 104 may be one or more computers configured to receive requests for information over network 103 and provide information to components over network 103. For example, in one embodiment, server 104 may include one or more computer or data processing devices that have hardware (e.g., processors, storage memory, data buses, network interface, etc.), software (e.g., application programs, operating systems, other executable program code written in any known programming language such as PL/SQL, AJAX, XML, JavaScript™, C, C++, Java™, etc.), and/or firmware (e.g., software embedded in a hardware device) that provide access to information stored and managed by database system 106. Server 104 may be a Web server that processes requests for information and provides information to client 102 over network 103. In other embodiments, server 104 is configured as a Web server that receives one or more Web pages including content from another component of system environment 100, such as database system 106, and provides the received Web pages to a requesting client 102. For example, server 104 may be an APACHE server or the like. In certain embodiments, server 104 may be configured not to function as a true application server. Instead, server 104 may be configured to function as an interface to access an application layer included in database system 106. Thus, in certain embodiments, software, algorithms, web rendering logic, data, etc. used to provide applications may reside in the database system 106, and not with server 104. Server 104 may be configured to receive requests related to an application, forward the requests to database system 106, and receive application or application-related information from database system 106. Among other things, this exemplary configuration may help eliminate latency problems inherent in conventional n-tier architectures that employ application servers external to a database system.

Although FIG. 1 shows server 104, developer 120, and client 102 as separate entities, the disclosed embodiments may implement single computer systems that operate as a client, developer, and a server computer system, or any combination thereof.

Database system 106 may be one or more computers that are configured to provide database management and application server processes. Database system 106 may be connected to server 104 over a communication network 105, which may be any type of wireline and/or wireless communication network or data link, such as a LAN, WAN, or other type of connection. Further, database system 106 may communicate with server 104 via network 103. In one embodiment, database system 106 may be configured to receive requests for information (e.g., content, application, data, program code, etc.) and provide responses to the requests. For example, database system 106 may be a mainframe, a server computer, a desktop PC, a laptop PC, a PDA, a cell phone device, or any other processor, computer, or device (or group thereof) capable of receiving requests for information from server 104 and delivering response to the requests to server 104. In one embodiment, database system 106 may include one or more computer or data processing devices that have hardware (e.g., one or more processors, storage memory, data buses, network interface, etc.), software (e.g., application programs, database program code, and other executable program code written in any known programming language such as PL/SQL, AJAX, HTML, JavaScript™, C, C++, Java™, SQL, etc.), and/or firmware (e.g., software embedded in a hardware device).

In accordance with certain embodiments, database system 106 may include a database system module 107 and application server module 108. Database system module 107 may be software, hardware, and/or a combination thereof, that is configured to provide database management functions, such as an Oracle® database. For example, database system module 107 may include one or more storage devices, such as databases, that are configured to store data. The data may be configured in any type of format, such as tables, arrays, database objects, etc. Further, database system module 107 may further include software and/or hardware that is configured to manage the data in the storage devices, such as writing, reading, editing, deleting, etc. In one embodiment, database system module 107 may include software executed by a processor that provides Data Manipulation Language (DML) features, which is a family of computer languages used by computer programs or database users to retrieve, insert, delete and update data in a database. For example, database system module 107 may implement SQL, which is the DML for Oracle® databases, and provide commands to manipulate data within existing database objects, such as SELECT, UPDATE, INSERT, and DELETE commands.

As indicated, database system 106 may also include application server module 108. This module may be hardware and/or software that is configured to provide application services and security features for database system 106. For example, application server module 108 may include software that is executed by a processor to create Web-based applications that create Web content rendered in Web pages that are provided to server 104 for delivery to client 102. In certain embodiments, server 104 may send a request for information to database system 106, which is processed by application server module 108. Module 108 may perform security operations to ensure only authenticated users receive information. Further, application server module 108 may perform processes that determine the type of information requested, issue requests for specific data to database system module 107, receive the requested data, create and render Web content and Web pages based on the received data, and deliver the Web content and/or Web page(s) to server 104 or developer 120.

Figure 2:
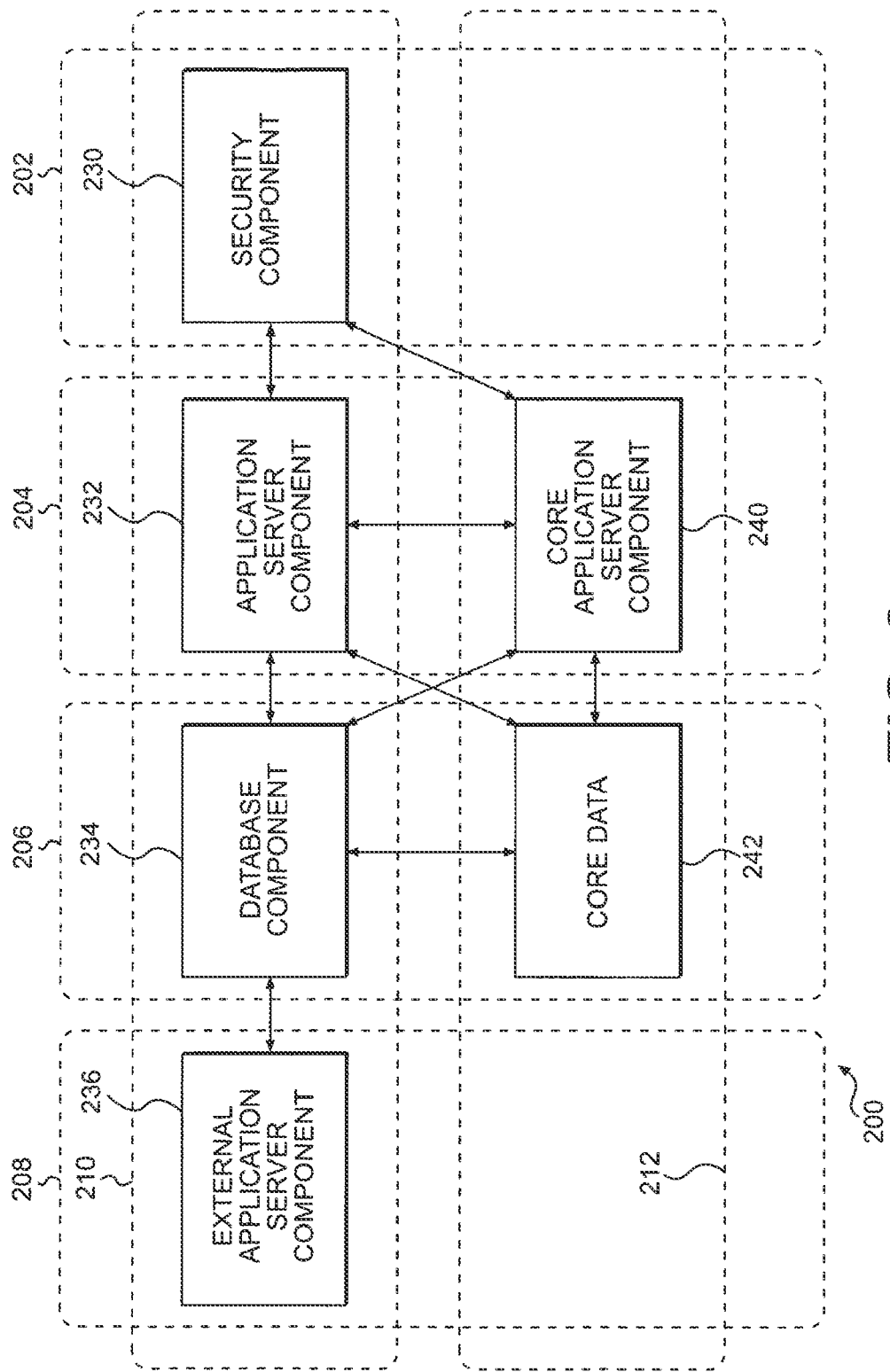
FIG. 2 illustrates a block diagram of a framework consistent with certain disclosed embodiments of the present invention.

FIG. 2 shows an exemplary framework 200 that provides flexibility in developing applications and providing applications to users, as well as ensuring the security of code and data in doing so. In one embodiment, framework 200 is included in database system 106. Framework 200 may include one or more software components that enable Web pages to be built securely and quickly while maintaining a consistent look and feel of an application. In one embodiment, framework 200 implements software that provides user authentication and validation, Web pages and Web-level security, application administrative features, interfaces for implementing pre-built applications that are pluggable into framework 200 for rendering application Web content, and user activity monitoring functionalities.

In one embodiment, the software components of framework 200 may be configured in a multi-layer scheme. For example, framework 200 may include vertical component layers 202, 204, 206, and 208, that reflect different layers of security and functionality of database system 106.

In one example, vertical layer 202 may reflect a database and application Web access layer that includes security component 230. Security layer 202 represents database login and other security features that manage, control, and process user requests for information provided by database system module 107. Layer 202 may be a controlled single point of entry to database system 106. In one embodiment, layer 202 does not have direct access to any database tables or data. Instead, layer 202 may be configured only to execute one or more software packages implemented in layer 204. Thus, in these embodiments, layer 204 may only be accessed through security layer 202.

Layer 204 represents a Web application layer 204 that provides Web content and application renderings software packages for creating Web applications and pages for delivery to server 104 via layer 202. In one embodiment, layer 204 may be configured to generate Web pages from one or more software packages, such as Oracle® database packages, that are created to provide consistent look and feel while enforcing application security. In one embodiment, one or more of the software packages may be executed by layer 202.

Layer 206 represents a database table layer 206 that provides database tables and software packages for processing DML commands and other database access operations. In one aspect of the disclosed embodiments, database table layer 206 provides software components for processing requests for data from Web application layer 204 for generating and developing Web applications and content. In certain embodiments, database system 106 insulates layer 206 from Web access by controlling access to this layer through Web application layer 204. Thus, in certain embodiments, access to layer 206 may be performed only by executing one or more software packages in layer 204, via security layer 202.

Layer 208 represents an external transaction layer 208 that provides software components for processing data received from external sources, such as data warehouse acquisition processes of Extracting, Transforming (or Transporting) and Loading (ETL) data from source systems into database system 106.

Framework 200 may also include horizontal layers 210 and 212 that implement control over information used to develop and build applications that may use content, such as text, graphics, multimedia-based information, etc. For example, layer 210 may reflect an applications layer that include software components configured to provide custom built applications and customizable pre-built Web applications used to provide information to server 104. Authorized users (e.g., developers) and software code, may access and use software components in the applications layer 210 to develop applications. Layer 212 may reflect a core interface layer 212 that includes software components that provide non-customizable core database objects and software packages that may include proprietary data and code. The data and software provided in core interface layer 212 may be encrypted or otherwise protected and accessible only to authorized users or programs, such as a superuser, administrator, or other designated user(s)

or software process(es). In one embodiment, information residing in the core interface layer 212 are insulated and secure than the information provided in applications layer 210. For instance, core interface layer 212 may include information protected by additional security mechanisms, such as encryption, database access control processes, or the like. Thus, in certain embodiments, layer 210 may be used for building custom applications using software modules in layer 212 that are configured to perform Web rendering operations (e.g., generating content for display on a Web page, etc.).

In certain embodiments, one or more software components of framework 200 may be associated with either database system module 107, application server module 108, or both. For example, the software components residing in security layer 202 and/or Web application layer 204 may be associated with application server module 108 and the software components residing in database table layer 206 may be associated with database system module 107. Alternatively, one or more software components residing in Web application layer 204 may be associated with both application server module 108 and database system module 107.

Collectively, the software components of framework 200 communicate with each other in certain fashions to maintain security and logical separation between the different layers 202-212. In one embodiment, database system 106 may maintain user accounts including security profiles for the users reflecting access privileges to applications and information for each user. Each application user account may have one or more privileges to run Web-based applications by executing one or more Web software packages provided by one or more software components in Web application layer 204. Those Web software packages communicate with, for example, DML software packages provided by database table layer 206 to provide database table access and modifications for rendering Web content and Web pages by Web application layer 204. Thus, for example, when client 102 requests access to an application provided by database system 106, browser software executing in client 102 may contact server 104, which in turn communicates with database system 106 as an application user. This communication session is recognized by database system 106 as an application user with certain privileges defined in that application user's account.

As shown in FIG. 2, in one embodiment, framework 200 may include a security component 230 that resides in both the security layer 202 and applications layer 210. Security component 230 may include information, such as synonyms, references, etc., that point to software in layer 204. This information, when processed by a processor, provide security mechanisms for controlling access to data and application software for Web applications provided by database system 106. In one embodiment, security component 230 executes code that processes received access requests from server 104 or developer 120, such as performing login processes for identifying valid users based on stored user account information. A "user" may be considered software code (e.g., software application), and/or an individual or entity using a computer, such as client 102 or developer 120.

Application server component 232 resides in both the Web application layer 204 and applications layer 210 and reflects software that is executed by a processor for providing custom built and customizable pre-built software for providing Web applications. Exemplary software included in application server component may include directory applications, information for assisting the development of applications (e.g., help information), home Web page applications, and user administration applications for generating user directory listings and providing processes for creating and modifying user account information. Other software may be included in application server component 232 consistent with the disclosed embodiments.

In one embodiment, database component 234 resides in both the database table layer 206 and application layer 210 and may reflect software executed by a processor in the form of custom built and customizable pre-built software packages for processing DML and utility commands. For example, database component 234 may include application data, DML, and utilities. Further, database component 234 may include a security package that performs authentication access for user and Web page authentication, as well as other forms of security checking for data maintained in one or more databases managed by database system module 107. Database component 234 may also include DML software packages for retrieving user directory data and loading user profile information into the database portions storing such information, as well as for any other applications built or may be built in component 232.

External application server component 236 may reside in the application layer 210 and reflect software that is executed by a processor for handling ETL processes for loading data into the database managed by database system component 107.

Framework 200 may also include core application server component 240 that resides in both Web application layer 204 and core interface layer 212. In one embodiment, core application server component 240 may reflect software that is executed by a processor for providing pre-built and non-customizable software packages for developing, executing, building, etc. Web applications. These packages may be encrypted or otherwise protected for providing security to proprietary software code used for Web application development and/or generating. In one embodiment, core application server component 240 may include software that define applications, Web page navigation trees, user account profiles and privileges, Web page and data field security features, and meta data. Core application server component 240 may also include software for providing HTML generation processes, such as customizing global variables used in software applications, procedures and functions for generating Web form elements, such as input fields check boxes, drop down lists, etc., core application code and other types of features used in building Web content for a Web page related to an application. In one embodiment, core application server component 240 includes interface software that receives, and authenticates requests related to application server component 232 and/or database component 234.

Core data component 242 may reside in both database table layer 206 and core layer 212 and reflects software executed by a processor for providing pre-built and non-customizable software packages for handling DML and utility commands and features consistent with the disclosed embodiments. For example, core data component 242 may include software packages including DML procedures and functions for retrieving and loading administrator data, utility functions and procedures for administrator users, packages for handling document uploads into the database managed by database system module 107, procedures to record errors during application use, packages for interfaces user security to LDAP servers, security procedures and functions for authenticating a user and validating access to a requested application page, and other types of database management functions. Core data component 242 may include interfaces that process requests from database components 234, application server component 232, and core application server component 240, for developing, accessing, and executing Web applications consistent with the disclosed embodiments.

Accordingly, in accordance with certain disclosed embodiments, framework 200 is configured to provide secure and logical separation between certain processes for developing, building, and executing Web applications. In one example, using the multi-layered configuration of framework 200, proprietary information managed and by core layer 212 is protected but accessible by authorized users and software components for building Web applications for delivery to developer 120 or to client 102 via server 104.

In another embodiment, database system 106 provides an application interface to framework 200 that allows users to perform some administrative tasks and application configurations tasks, such as creating user profiles, adding lookup codes, and registering Web pages. The interfaces may be configured such that Web pages built within an application have similar look and feel (e.g., format,) to enable a user, such as a developer, to re-use features and Web content, such as headers, hierarchy trees, footers, navigation buttons, etc., when developing Web applications.

In one embodiment, the user interface may include an administration section that enables users to maintain certain software interface modules and customize them for specific applications. Thus, a user may use the administration section to create lookup codes, add users accounts, create profiles, etc.

As noted above, in accordance with certain disclosed embodiments, a user may need a user account to access an application provided by database system 106. Each user account also includes a profile that determines the user's access level to data and application content. A profile determines the level of access for the user, such as a developer profile, system administrator, and consultant profiles. Each type of profile may provide different levels of access to information or software. A developer may implement framework 200 and its application interface to create user accounts and profiles. For example, a developer may create a user account by assigning a username and password to the account that is checked when the assigned user attempts to access or create an application via database system 106. Additionally, in one embodiment, each user profile may include a privilege. Thus, a privilege may be assigned as part of a profile, which in turn is assigned to a user account. In another embodiment, framework 200 allows user accounts to be assigned Web page and data field security that controls which pages and data fields a user can access. Thus, a user account may be assigned access to only certain Web pages and data fields linked to certain content on a given Web page.

Figure 3:
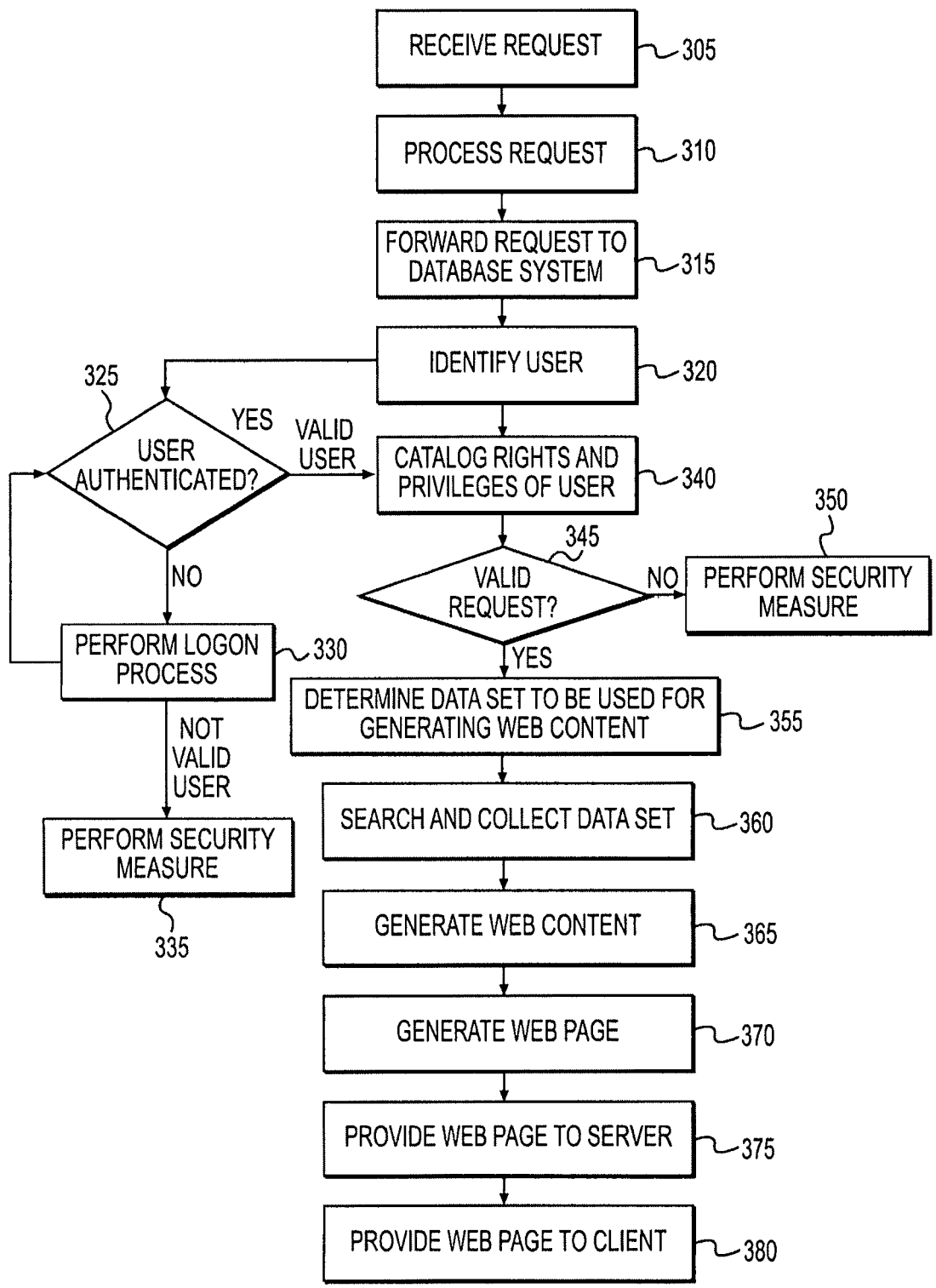
FIG. 3 illustrates a flowchart of an exemplary application service provision process consistent with certain disclosed embodiments of the present invention.

As explained, certain aspects of the disclosed embodiments allow Web applications to be built and created in more secure and scalable distributed environment than conventional architectures. FIG. 3 illustrates a flowchart of an exemplary application rendering process consistent with certain disclosed embodiments.

Initially, client 102, or developer 120, may issue a request for accessing a Web application to server 104 over network 103 (Step 305). Server 104 processes the request to determine that the client is requesting access to an application managed by database system 106 (Step 310). Server 104 then forwards the request to database system 106 (Step 315).

In one embodiment, security layer 202 of framework 200 implemented by database system 106 receives the requests and provides it to security component 230 for processing. Security component 230 may access security data in component 242 through application code in core application server component 240 to identify the user based on user account information maintained locally by security component (Step 320). If the user is authenticated (e.g., determines that the user has a valid account) (Step 325; Yes), processing continues to step 340. However, if the user is not authenticated (Step 325; No), security component 230 may perform a logon process (Step 330). The logon process may include presenting a query to the user for a logon identifier and password. Security component 230 may be configured to receive and validate the user's response to the query. If validated (Step 325; Yes), the process continues to step 340. If, however, the user is not validated, security component 230 may perform a security measure that prevents the user from accessing information provided by database system 120, such as blocking access, generating and sending security messages to appropriate entities, etc. (Step 335).

At step 340, security component 230 may send the request and appropriate user information to application server component 232, thus passing processing control over the request from security layer 202 to Web application layer 204. In response, application server component 232 determines the user and identifies the application (and information related to the application) requested by the user to catalogs the rights and privileges of the user (Step 340). In one embodiment, application server component 232 may use the interface to core application server component to determine the rights of the user for accessing the requested application. In this instance, processing of the request may include both application layer 210 and core interface layer 212. In response, core application server component 240 may perform one or more processes that access information related to the user's account, such as user rights and privileges, to determine whether the user is allowed access to the requested application. Core application server component 240 provides a response to application server component 232 indicating whether the user is allowed to access the application. If the request is not valid (e.g., the user's account indicates that the user is not allowed to the requested application or some portion thereof), application server component 232 performs a security measure (Step 350). For example, application server component 232 may provide a message through component 230 back to client 102 via server 104 indicating that the user is denied access to the requested application. Alternatively, or additionally, application server component 232 may generate an alarm that is sent to one or more predetermined entities, such as an administrator or software monitoring package that logs the user's attempted access to the application. Other forms of security may be implemented and the above examples are not intended to be limiting to the disclosed embodiments.

If, on the other hand, the user's request is determined to be valid (Step 345; Yes), application server component 232 executes one or more processes to build a Web page associated with the requested application. In another embodiment, or core application server component 240 may execute one or more of the processes to build the Web page associated with the requested application. In one embodiment, application server component 232 (or component 240) may determine the type of information to be rendered in the Web page. Depending on the requested application, application server component 232 (or component 240) may request and collect information from pre-built or customized applications managed by application server component. Alternatively, application server component 232 (or component 240) may request, collect, and/or execute certain non-customized or proprietary software packages or information is needed to build the Web page. Thus, in one example, application server component 232 (or component 240) may determine information, such as a set of information, that identifies information needed for generating the Web content used in the requested application (step 355).

Application server component 232 may invoke a software procedure that creates a request for the identified information and sends the request to database component 234. In response, database component 234 may execute a process that searches the database maintained by database system module 107 to collect the specific information identified by application server component 232 (Step 360). In one embodiment, database component 234 may generate and execute DML and utility commands to accesses the database to collect the information set using software packages maintained in the application layer 210 database component 234.

Alternatively, or additionally, database component 234 may determine that additional information or software packages managed by core data component 242 is required. As a result, database component 234 may use the interface to core data component 242 to invoke software packages executed by that component to collect information for building the Web page associated with the requested application.

Alternatively, application server component 232 may provide a request to core data component 242 for information based on whether the information is processed and managed by core layer 212 or application layer 210. Core data component 242 may provide the requested information to database component 234 and/or application server component 232.

In accordance with certain embodiments, a customized or customizable application may reflect an application that may be modified by an authorized user to fit particular needs and specifications using predetermined and pre-built application software packages maintained and managed by framework 200. Further, a non-customizable application or database objects may reflect software applications or objects that cannot be manipulated by a user accessing database system 106 for building Web pages or applications. However, in certain embodiments, non-customizable application software and database objects may be used by certain authorized users or software packages executed by application layer software components to assist in generating and building Web applications. These authorized users or software packages may be assigned an appropriate authority, such as a database administrator or other designated personnel.

Once the data set is collected, application server component 232 and/or core application server component 240 in layer 204 may generate Web content (e.g., information such as graphics, text, multimedia data, etc.) (Step 365). Layer 204 may then generate an application Web page based on the generated Web content (Step 370). In certain embodiments, layer 204 may generate the Web page based on at least one application Web page template that provides a predetermined format for at least one portion of the Web page. The at least one application Web page template may provide information that allows layer 204 to generate a Web page with consistent look and feel each time the Web page with particular content is being rendered.

Once the Web page is generated, layer 204 may provide the generated Web page to layer 202. In turn, layer 202 may then provide the generated Web page to server 104 (Step 375). Server 104 may then provide the Web page to client 102 through network 103 (Step 380).

Figure 4:
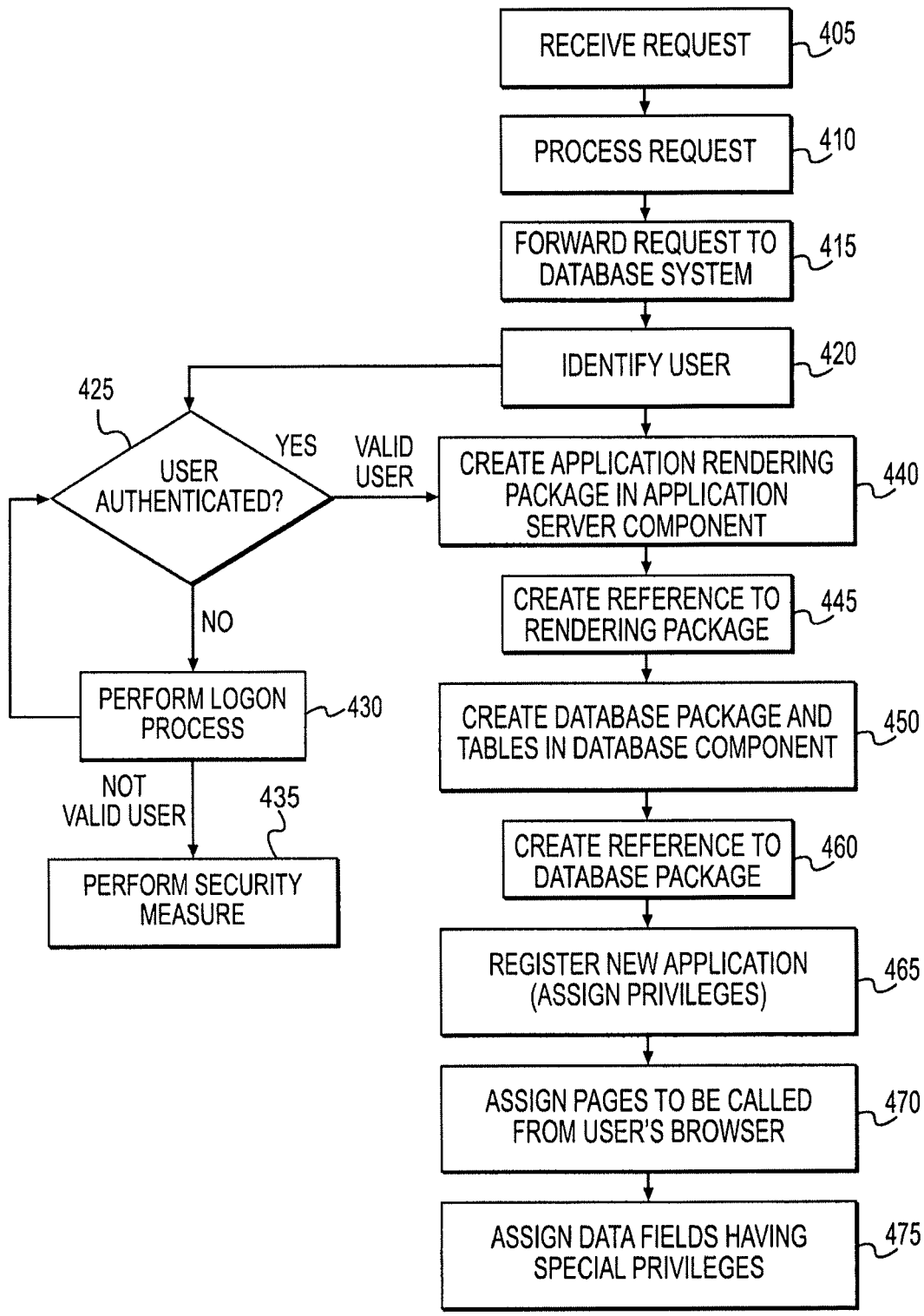
FIG. 4 illustrates a flowchart of an exemplary application service generation process consistent with certain disclosed embodiments of the present invention.

As described, database system 106 is configured with framework 200 to control the access to data used to generate Web pages containing content for users. Methods and systems consistent with the disclosed embodiments also enable a user or software to develop Web applications using framework 200. FIG. 4 illustrates a flowchart of an exemplary application creating process consistent with certain disclosed embodiments.

Initially, an authorized user, such as a developer, using developer 120, with a user profile authorizing application development, issues a request to database system 106 for building an application (Step 405). In response, server 104 processes the request to determine that the user is requesting access to database system 106 for building an application (Step 410). Server 104 then forwards the request to database system 106 (Step 415).

In one embodiment, security layer 202 of framework 200 implemented by database system 106 receives the requests and provides it to security component 230 for processing. Security component 230, through software packages executed by modules in layers 204 and/or 206, such as those executed by modules 232, 234, 240, and/or 242, may identify the user based on user account information maintained locally by security component (Step 420). If the user is authenticated (e.g., does the user have a valid account) (Step 425; Yes), processing continues to step 440. However, if the user is not authenticated (Step 425; No), security component 230 may perform a logon process (Step 430). The logon process may include presenting a query to the user for a logon identifier and password. Security component is configured to receive and validate the user's response to the query. If validated, the process continues to step 440. If, however, the user is not validated, security component may perform a security measure that prevents the user from accessing information provided by database system 120, such as blocking access, generating and sending security messages to appropriate entities, etc. (Step 435).

At step 440, security component 230 may send the request and appropriate user information to application server component 232, thus passing processing control over the request from security layer 202 to Web application layer 204. In response, the user may implement software in application server component 232 to create an application rendering software package that performs one or more of the Web application building processes described above in connection with FIG. 3. Once the rendering package is created, the user may create a reference to the new application rendering package in the security component 230 to allow subsequent accesses to the application to be identified by security component 230 (Step 445).

Once the rendering package and reference are created, the user may create a database software package in database component 234 that includes application DML and utility commands and any tables that will be used by the application under development (Step 450). Once completed, the user may also create a reference to the database package in application server component 232 for subsequent access by component 232 when rendering Web content for the application (Step 460).

The user may then register the new application with database system 106 and assign one or more privileges to the new application (Step 465). For example, the user may assign the new application with one or more privileges that limit the type of content to be rendered to a requesting user. Also, the user may assign one or more Web pages that will be called from a requesting user's browser when the application is requested (Step 470). Further, the user may assign one or more privileges to one or more data fields in the Web pages that are assigned to the new application (Step 475). Once completed, the created software packages are maintained and managed by framework 200 for subsequent execution when the new application is requested by a user accessing database system 106 via server 104.

Accordingly, methods and systems consistent with the disclosed embodiments implement a multi-tier architecture that uses a multi-layer framework 200 for providing security measures and Web page rendering processes local to database system 106. The unique framework 200 provides a configuration to allow the Web page application to be created in a secure manner without compromising proprietary information maintained by core layer 212.

Methods, systems, and articles of manufacture consistent with certain aspects of the present invention provide a multi-tier distributed system that addresses the inherent problems with traditional 'n-tier' applications that consist of a database server, an application server, and a client. These problems include high network data load between the database and application server, the latency between obtaining access to the application server, sending requests to the database, retrieving data and sending back the data to the application server, then formatting the required data to return to the browser, and recovery problems based on that application servers are generally not included in the backup and recovery plans often afforded to the database server. For instance, certain embodiments provide features that consolidate physical servers into one physical server, yet retain the logical separation and functionality, while ensuring data insulation and security. For example, methods, systems, and articles of manufacture consistent with certain aspects of the present invention provide a multi-tier distributed system that allows a database system to provide both database and application server functionalities that determine locally the type of information (e.g., data, content, etc.) used for creating a Web application based on user privileges processed at the database system, as opposed to, for example, transmitting data between a database system and a remote application server over a network for remote Web content rendering.

Further, methods, systems, and articles of manufacture consistent with certain aspects of the present invention provide a multi-tier distributed system that provides secure access to data through the vertical and horizontal layers of framework 200. For example, a user that gains unauthorized access to server 104 and eventually Web access layer 202 may be prevented from gaining access to data and code maintained by database system 106. For instance, in certain embodiments, the secured configuration of framework 200 enables layer 204 to enforce application security at layer 204. Thus, the security features implemented by layer 204 may prevent unauthorized access to its layer and layer 206. Further, layer 206's security features provide another level of security as access to this layer is only performed by executing packages in layer 204.

Figure 5:
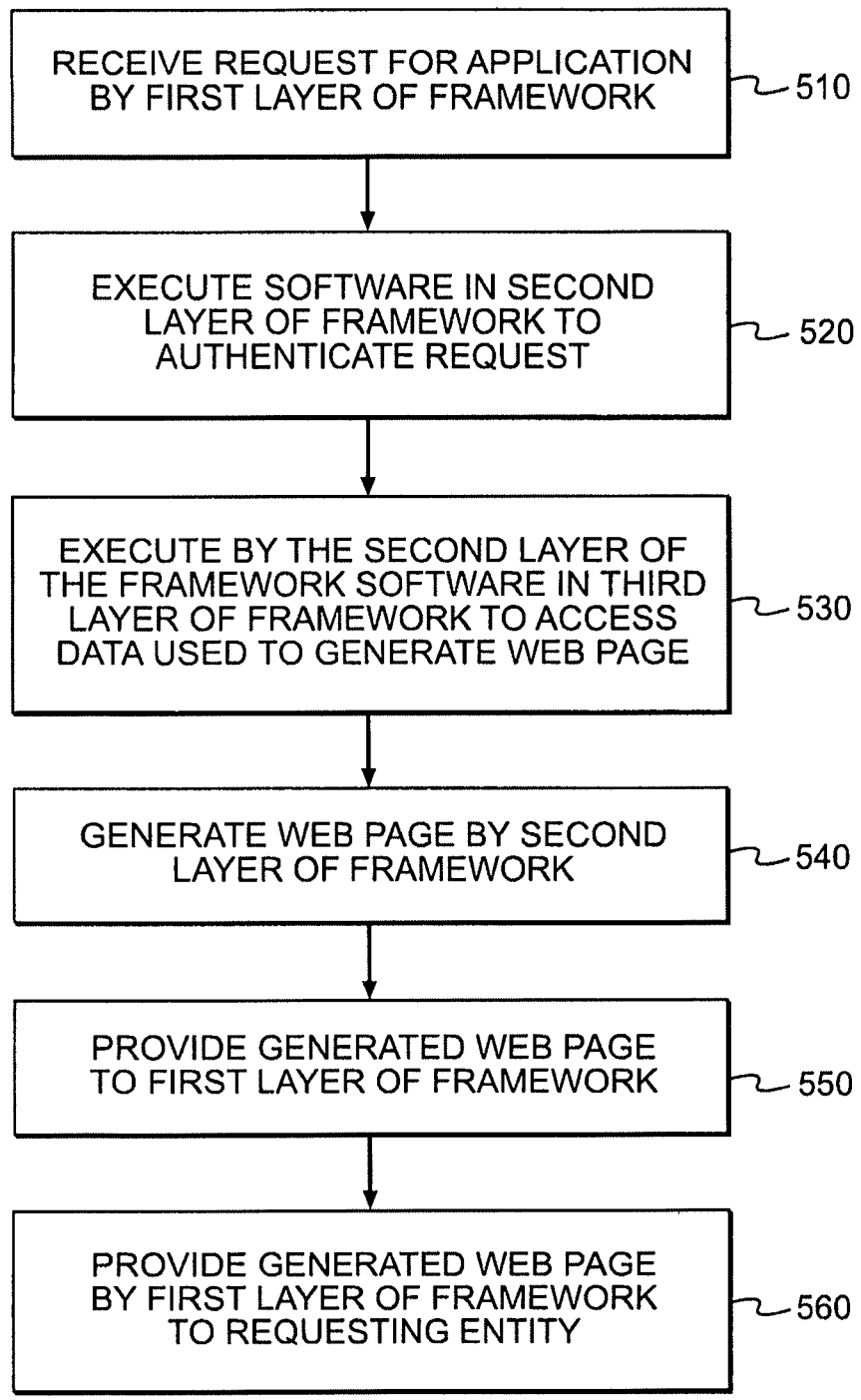
FIG. 5 illustrates a flowchart of an exemplary process for providing Web applications consistent with certain disclosed embodiments of the present invention.

For example, FIG. 5 shows a flowchart of an exemplary process for providing an application Web page using framework 200 consistent with certain disclosed embodiments. As shown, a first layer of framework 200 (e.g., layer 202) may receive a request for an application from some requesting entity (e.g., server 104, developer 120, etc.) (Step 510). Consequently, the first layer may execute software in a second layer (e.g., layer 204) to authenticate the request to determine whether the requesting entity is allowed access to the Web application (Step 520). If the request is authenticated, the second layer may execute software in a third layer of the framework (e.g., layer 206) to access data that is used to generate a Web page related to the Web application (Step 530). The third layer provides the data to the second layer. The second layer may then generate the Web page using, for example, the data (Step 540). The second layer may use other information to build the Web page, such as template information that provides a consistent look and feel for the Web page related to the Web application. The second layer may then provide the generated Web page to the first layer (Step 550). Once received, the first layer may then provide the generated Web page to the requesting entity (Step 560).

Accordingly, the exemplary process of FIG. 5 describes one aspect of the disclosed embodiments that demonstrate the efficiencies and securities features offered by the multi-layered framework 200 in providing Web applications. For example, by generating the Web page at the database system 106, there is reduced latency on network communications involving network server 104. Moreover, the logical separation of layers prevents the first layer of the framework to have direct access to data related to requested Web applications, thus improving security is offered if there is unauthorized access to server 104 and/or the first layer of framework 200.

Other embodiments will be apparent to those skilled in the art from consideration of the specification and practice of the exemplary disclosed embodiments of the invention disclosed herein. For example, the process and sequence of steps shown in the figures are not limited to the sequence described therein. Variations of these sequences, such as the reordering, removal and/or the addition of other steps may be implemented without departing from the scope of the embodiments of the present invention. Also, although FIG. 1 shows a single database system 106, the disclosed embodiments may implement multiple database systems 106 that are distributed among network 103 or other communication network and collaborate to perform one or more processes consistent with the disclosed embodiments.

Figure 6:
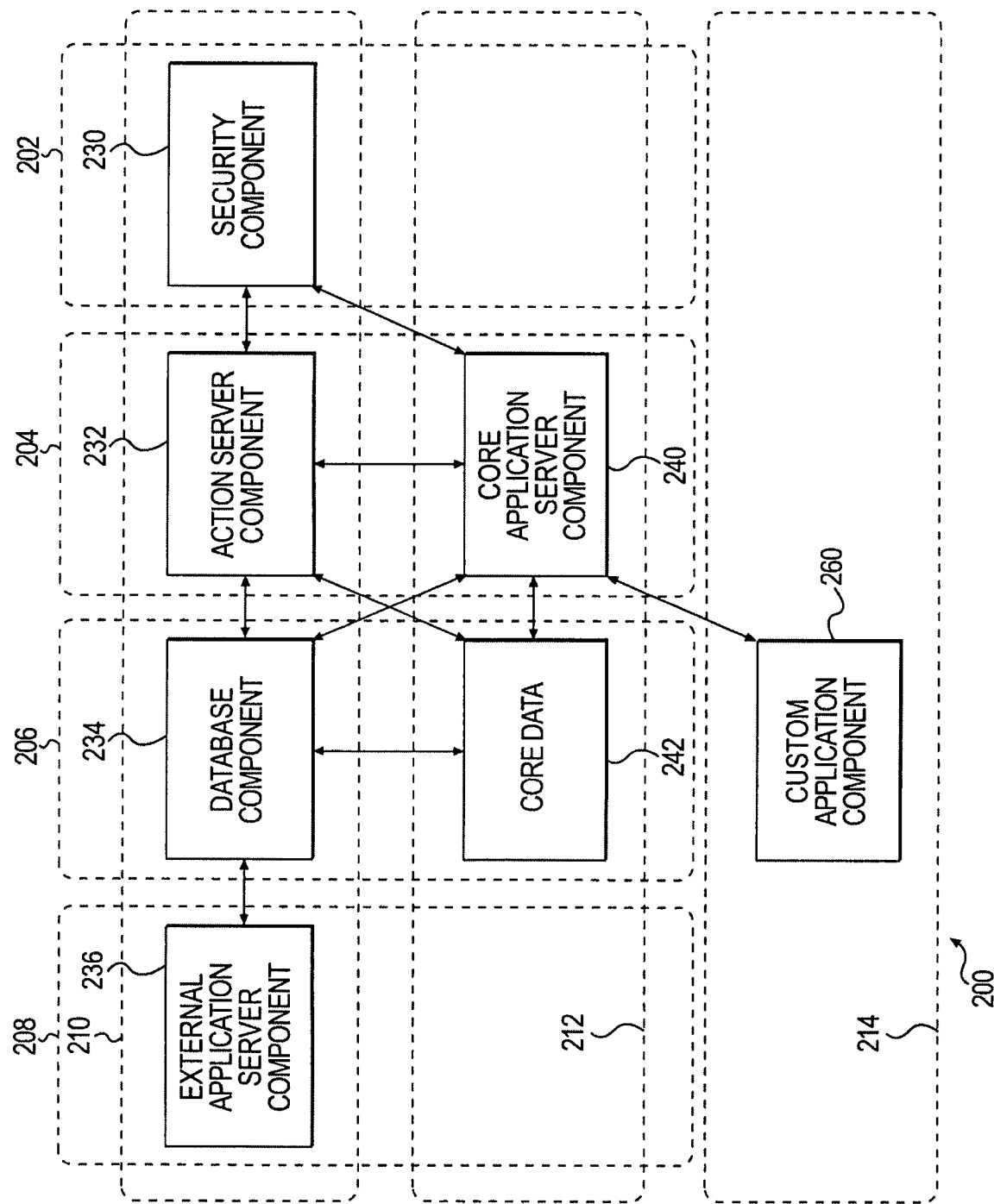
FIG. 6 illustrates another block diagram of a framework consistent with certain disclosed embodiments of the present invention.

Further, although FIG. 2 shows framework 200 with a certain number of layers and software components, additional or fewer layers or components may be implemented by the disclosed embodiments. For example, in one embodiment, framework 200 may include a custom application component that allows a user (e.g., developer) to customize values for one or more parameters for use throughout the application. For example, the custom application component may allow a user to input values for application name, application logo, a company name, company address, or any other type of information that may be used in a Web page. In one embodiment, a user, such as a developer, may access the custom application component through security component 230 and possibly other layers, such as layer 204 to input variables for application parameters. Further, in certain embodiments, the custom application may reside in a different horizontal layer than those layers 210 and 212. In another embodiment, the custom application component may reside in one of the vertical layers 204, 206, 208, or a different vertical layer within framework 200. For example, as shown in FIG. 6, framework 200 may include a CS-custom application component 260 that resides in horizontal layer 214 and vertical layer 206. Alternatively, component 260 may reside in horizontal layer 210 and vertical layer 206. In other embodiments, the software that enables the custom application variables to be used by a user may be coded in one of the other components of framework 200, such as core data component 242 or database component 234.

The disclosed embodiments may be implemented in various environments. Such environments may be specially constructed for performing the various processes and operations of embodiments of the invention or they may include a general purpose computer or computing platform selectively activated or reconfigured by program code to provide the necessary functionality. The exemplary methods of the disclosed embodiments are not inherently related to any particular computer or other apparatus, and aspects of these processes may be implemented by a suitable combination of hardware, software, and/or firmware. For example, various general purpose machines may be used with programs written in accordance with certain embodiments of the invention, or may be implemented using a specialized apparatus or system to perform one or more processes consistent with the disclosed embodiments.

The disclosed embodiments may also relate to program instructions or program code stored on computer readable media for performing various computer-implemented operations. The program instructions or code may be specially designed and constructed for the purposes of the disclosed embodiments, or they may be of the kind well-known and available to those having skill in the computer software arts. Examples of program instructions and code include, for instance, machine code, such as produced by a compiler, files containing a high level code that can be executed by the computer using an interpreter, and any other type of computer instruction that may be executed by a processor, or program logic.

The storage media referred to herein may reflect elements that temporarily or permanently store data and instructions. The storage functions associated with the disclosed embodiments may be implemented via a computer, portions of a computer, a processor, a computer network, and any other component and medium capable of storing information. For example, various types of storage media may be used to store information associated with the embodiments of the present invention, such as read-only memory (ROM), random access memory (RAM), and any other type of memory. Further, the storage functions associated with the disclosed embodiments may be physically implemented by computer-readable media, such as, for example (a) magnetic media (e.g., a magnetic disk, a tape drive, etc.; (b) optical media, (e.g., a CD-ROM, digital versatile disk (DVD), a mini-disc, etc.); and (c) semiconductor or other media (e.g., DRAM, SRAM, EPROM, EEPROM, flash memory, etc.).

Further, the disclosed embodiments may be implemented using various types of transmission protocols and data formats, such as, for example, transmission control protocol/internet protocol (TCP/IP), hyper text transfer protocol (HTTP), secure HTTP, wireless application protocol (WAP), hyper text markup language (HTML), extensible markup language (XML), Standard Generalized Markup Language (SGML), etc.

What is claimed is:

1. A database system for providing applications, comprising:
   a processor; and
   one or more memory devices storing software executable by the processor, the stored software arranged in an application layer including software components that, when executed by the processor, perform processes for accessing predetermined Web applications and building a first type of applications, the application layer software components including:
      a security software component that, when executed by the processor, provides security processes for authenticating requests related to applications maintained by the database system,
      an application server component that provides application server functions for building the applications in response to the requests authenticated by the security software component, and
      a database software component that provides back-end database access and manipulation processes based on data manipulation language commands for providing data stored in a database and used by the application server software component in building the applications; and
   the software stored in the one or more memory devices also arranged in a core layer including software components that, when executed by the processor, perform processes for providing a second type of applications that is secured from modification and accessible by authorized application layer software components to assist in building the first type of applications, the core layer including:
      a core application server component including secure software packages for generating data fields in the first type of applications, and
      a core data component including secure software packages for accessing secure data stored in the database, wherein:
         the security software component is also included in a security layer that does not have direct access to the data stored in the database and is configured to execute one or more software packets implemented in the application layer,
         the application server component and core application server component are included in the application layer, the application server component including the software packages implemented by the application layer that build the first type of applications, when executed by the processor, for delivery to a computer external to the database system via the security layer, and
         the data base component and core data component are also included in a database table layer, and access to the database table layer to build the first type of applications is performed only by execution of the one or more of the software packages implemented by the application layer via the security layer.

2. The database system of claim 1, further including:
   a custom application component that receives input values for parameters related to the first type of application, the custom application component included in a custom application layer separate from the application later and the core layer.

3. A system for providing applications, comprising:
   a processor; and
   a database including: data,
   a security software component that, when executed by the processor, provides a security process for authenticating a request relating to the applications and that does not have direct access to the data stored in the database and is configured to execute one or more software packages implemented in an application layer,
   an application server software component included in the application layer that, when executed by the processor, provides application server functions for building a first application based on the data in response to the request authenticated by the security software component, and
   a database software component that, when executed by the processor, provides back-end database access and data manipulation processes for performing data manipulation language operations on the data stored in the database and providing information to the application server software component to assist in building the first application,
   wherein the processor is configured to execute software that controls access to the application server component through the security software component, and controls access to the database software component through the application server software component, such that the security software component uses software implemented in the application software component and the application software component invokes one or more functions provided by the database software component.

4. The system of claim 3, wherein the database is an Oracle® database.

5. The system of claim 3, wherein the database software component performs a process to search the database for specific data requested by the application server module to build a Web page associated with the first application.

6. The system of claim 3, wherein the database further includes:
a core layer software component that, when executed by the processor, performs a process for providing a second application that is secured from modification and used by the application layer software component to assist in building the first application.

7. The system of claim 6, wherein the core layer includes a core application server component used by the application server module for generating data fields in the requested application generated by one or more of the application software components, and a core data component used by the database system module for accessing secure data stored in the database.

8. A system for providing applications, comprising:
a processor; and
a database included in one or more memory devices storing a framework of software components that, when executed by the processor, perform processes for building the applications, the framework of stored software components including:
a first layer of software that, when executed by the processor, provides front-end security processes for controlling access to information related to the applications,
a second layer of software, when executed by the processor, provides application server functions for generating content based on the controlled access provided by the first layer and provides requests for data maintained by the database, and
a third layer of software that, when executed by the processor perform data manipulation language functions on the data stored in the database in response to the requests provided by the second software layer, wherein the processor is configured to execute the first and second software layers to authenticate a request relating to a first application, execute the second software layer to generate one or more requests for specific data, execute the third software layer to collect the specific data in response to the one or more requests generated by the second software layer, and execute the second software layer to create the content for an interface relating to the first application based on the collected specific data and build the interface based on the created content, and wherein access to the second software layer is controlled through the second software layer, such that the first software layer, when executed by the processor, controls execution of software implemented in the second software layer, and the second software layer invokes software in the third software layer used by the database.

9. The system of claim 8, wherein the processor is configured to execute the second software layer to provide the built interface to the first software layer for delivery.

10. A method performed for providing applications, comprising:
receiving a request relating to an application in a database configured to perform (i) database processes, when executed by a processor, for processing database commands for accessing and manipulating data stored in the database, and (ii) application server level processes for generating content for applications, the database including data manipulation language software that performs data manipulation language operations on the data stored in the database and a framework of software components that are logically configured in layers that provide controlled access to software and data associated with respective software components;
requesting, by a first one of the software components executed by the processor, authentication of the request related to the application;
determining, by a second one of the software components executed by the processor, whether the request is valid based on the authentication request from the first one of the software components;
requesting, by the second software component executed by the processor, the data maintained in the database for processing the request relating to the application;
retrieving, by a third one of the software components executed by the processor, the requested data maintained in the database in response to the request from the second software component, wherein the retrieving includes using, by the second software component executed by the processor, software associated with the third software component to access specific data from the database;
generating, by the second software component executed by the processor, a document relating to the application based on the retrieved data maintained in the database;
providing, by the second software component executed by the processor, the generated document to the first software component; and
providing, by the first software component executed by the processor, the generated document to a computer external to the database.

11. The method of claim 10, wherein requesting, by the first software component of the framework, authentication of the request includes:
using, by the first software component executed by the processor, software associated with the second software component to authenticate the request relating to the application.

12. The method of claim 10, further comprising;
controlling, by the first software component executed by the processor, execution of software implemented in the second software component; and
invoking, by the second software component executed by the processor, software in the third software component to access the specific data from the database.

13. The method of claim 12, further comprising:
generating, by the second software component executed by the processor, an application interface based on at least one application template that provides a predetermined format for at least one portion of the application interface.

* * * * *